United States Patent [19]

Grot et al.

[11] Patent Number: 5,919,583

[45] Date of Patent: Jul. 6, 1999

[54] MEMBRANES CONTAINING INORGANIC FILLERS AND MEMBRANE AND ELECTRODE ASSEMBLIES AND ELECTROCHEMICAL CELLS EMPLOYING SAME

[75] Inventors: Walther Gustav Grot, Chadds Ford, Pa.; Govindarajulu Rajendran, Newark, Del.

[73] Assignee: E. I. du Pont de Nemours and Company, Wilmington, Del.

[21] Appl. No.: 08/920,982

[22] Filed: Aug. 29, 1997

Related U.S. Application Data

[60] Division of application No. 08/719,746, Sep. 25, 1996, abandoned, which is a continuation-in-part of application No. 08/407,146, Mar. 20, 1995, abandoned, and application No. 08/412,791, Mar. 29, 1995, abandoned

[60] Provisional application No. 60/003,736, Sep. 14, 1995.

[51] Int. Cl.$^6$ ................................ H01M 8/10
[52] U.S. Cl. .................. 429/33; 429/30; 429/40; 429/41; 429/46
[58] Field of Search ................. 429/30, 33, 40, 429/41, 46

[56] References Cited

U.S. PATENT DOCUMENTS

| 3,282,875 | 11/1966 | Connolly et al. | 260/29.6 |
|---|---|---|---|
| 3,664,915 | 5/1972 | Gore | 161/164 |
| 3,953,566 | 4/1976 | Gore | 264/288 |
| 3,962,153 | 6/1976 | Gore | 260/2.5 R |
| 4,187,390 | 2/1980 | Gore | 174/102 R |
| 4,358,545 | 11/1982 | Ezzell et al. | 521/27 |
| 4,940,525 | 7/1990 | Ezzell et al. | 204/252 |
| 5,422,411 | 6/1995 | Wei et al. | 526/243 |
| 5,599,638 | 2/1997 | Surampudi et al. | 429/33 |
| 5,766,787 | 6/1998 | Watanabe et al. | 429/33 |

OTHER PUBLICATIONS

Kjaer et al., Solid State Electrolyte Membranes for Direct Methanol Fuel Cells, *Solid State Ionics*, 46, No. ½, 169–173, May 1, 1991.

*An Introduction to Zeolite Molecular Sieves*, Alan Dyer, John Wiley & Sons, Chichester, New York, 1988, Chapter 1, No available month.

*Primary Examiner*—Bruce F. Bell

[57] ABSTRACT

Cation exchange membranes, made from polymer having cation exchange groups and containing inorganic filler, exhibit reduced fuel crossover for fuel cells employing direct feed organic fuels such as methanol and, when inorganic proton conductor is employed, enhanced proton conductivity.

8 Claims, 1 Drawing Sheet

MEMBRANES CONTAINING INORGANIC FILLERS AND MEMBRANE AND ELECTRODE ASSEMBLIES AND ELECTROCHEMICAL CELLS EMPLOYING SAME

RELATED APPLICATIONS

This is a division of application Ser. No. 08/719,746, filed Sep. 25, 1996, now abandoned which was a continuation-in-part of U.S. application Ser. No. 08/407,146, filed Mar. 20, 1995, now abandoned and a continuation-in-part of U.S. application Ser. No. 08/412,791, filed Mar. 29, 1995, now abandoned and claims benefit of U.S. Provisional application Ser. No. 60/003,736, filed Sep. 14, 1995.

FIELD OF THE INVENTION

This invention relates to ion exchange membranes and membrane and electrode assemblies useful in electrochemical cells and fuel cells such as fuel cells employing direct feed organic fuels such as methanol.

BACKGROUND OF THE INVENTION

A variety of known electrochemical cells fall within a category of cells often referred to as solid polymer electrolyte (SPE) cells. An SPE cell typically employs a membrane of an ion exchange polymer which serves as a physical separator between the anode and cathode while also serving as an electrolyte. SPE cells can be operated as electrolytic cells for the production of electrochemical products or they may be operated as fuel cells for the production of electrical energy. The most well known fuel cells are those which operate with gaseous fuels such as hydrogen and with a gaseous oxidant, usually pure oxygen or oxygen from air, and those fuel cells using direct feed organic fuels such as methanol.

In some SPE cells including many fuel cells, a cation exchange membrane is employed and protons are transported across the membrane as the cell is operated. Such cells are often referred to as proton exchange membrane (PEM) cells. For example, in a cell employing the hydrogen/oxygen couple, hydrogen molecules (fuel) at the anode are oxidized donating electrons to the anode, while at the cathode the oxygen (oxidant) is reduced accepting electrons from the cathode. The $H^+$ ions (protons) formed at the anode migrate through the membrane to the cathode and combine with oxygen to form water. In many fuel cells, the anode and/or cathode are provided by forming a layer of electrically conductive, catalytically active particles, usually also including a polymeric binder, on the proton exchange membrane and the resulting structure (sometimes also including current collectors) is referred to as a membrane and electrode assembly or MEA.

Membranes made from a cation exchange polymer such as perfluorinated sulfonic acid polymer have been found to be particularly useful for MEA's and electrochemical cells due to good conductivity and good chemical and thermal resistance which provides long service life before replacement. However, increased proton conductivity is desired for some applications, particularly for fuel cells which operate at high current densities.

In fuels cells which employ direct feed organic fuels such as methanol, a problem with known cells has been the so-called crossover of fuel through the membrane. The term "crossover" refers to the undesirable transport of fuel through the membrane from the fuel electrode or anode side to the oxygen electrode or cathode side of the fuel cell. After having been transported across the membrane, the fuel will either evaporate into the circulating oxygen stream or react with the oxygen at the oxygen electrode.

The fuel crossover diminishes cell performance for two primary reasons. Firstly, the transported fuel cannot react electrochemically and, therefore, contributes directly to a loss of fuel efficiency (effectively a fuel leak). Secondly, the transported fuel interacts with the cathode i.e., the oxygen electrode, and lowers its operating potential and hence the overall cell voltage. The reduction of cell voltage lowers specific cell power output and also reduces the overall efficiency. Therefore, it is especially desirable to provide a cation exchange membrane for use in a fuel cell which has a low fuel crossover rate.

SUMMARY OF THE INVENTION

The invention provides improved cation exchange membranes and also membrane and electrode assemblies and electrochemical cells which employ the membranes. A cation exchange membrane in accordance with the invention is made from polymer having cation exchange groups and having inorganic filler dispersed therein. In one preferred form of the invention, the polymer in the bulk of the membrane is substantially free of metal catalysts. Preferably, the inorganic filler is an inorganic proton conductor, more preferably an inorganic proton conductor selected from the group consisting of particle hydrates and framework hydrates. Most preferably, the inorganic proton conductor is selected from the group consisting of titanium dioxide, tin and hydrogen mordenite, oxides and phosphates of zirconium, and mixtures thereof. It is also preferred for the inorganic proton conductor to have a conductivity of at least about $10^{-4}$ S/cm. It is also preferred for the inorganic proton conductor to comprise about 2% to about 30%, most preferably, about 5% to about 25% by weight of the membrane.

Preferably, the cation exchange groups of the polymer are selected from the group consisting of sulfonate, carboxylate, phosphonate, imide, sulfonimide and sulfonamide. In one preferred form of the invention, highly fluorinated polymer with sulfonate cation exchange groups is employed. It has been found to be particularly advantageous for the polymer to comprise a highly fluorinated carbon backbone with its side chains represented by the formula —$(OCF_2CFR_f)_a$—$OCF_2CFR'_fSO_3X$, wherein $R_f$ and $R'_f$ are independently selected from F, Cl or a perfluorinated alkyl group having 1 to 10 carbon atoms, a=0, 1 or 2, and X is H, an alkali metal, or $NH_4$.

The invention also provides a fuel cell for operation with a direct feed organic fuel which includes an anode compartment containing an anode, a cathode compartment containing a cathode and a membrane serving as a separator and electrolyte between the anode and cathode compartments. The membrane comprises a polymer having cation exchange groups and which has inorganic filler dispersed therein. A preferred organic fuel is methanol.

Fuel cells employing direct feed organic fuels such as methanol made with the membranes of the present invention have reduced crossover of methanol fuel, providing enhanced electrical performance. Preferred membranes in accordance with the invention having inorganic proton conductor dispersed therein have enhanced proton conductivity and electrochemical cells such as fuel cells made with membranes of this invention have enhanced electrical performance.

Membranes of this invention also have enhanced mechanical properties due to incorporation of inorganic fillers, e.g., increased stiffness.

The invention also provides a membrane and electrode assembly comprising a cation exchange membrane of polymer having cation exchange groups with an electrode formed on at least one of its surfaces. The electrode comprises a layer of electrically conductive, catalytically active particles and binder polymer having cation exchange groups. In accordance with the invention, the binder polymer has inorganic filler dispersed therein.

The invention also provides a process for making cation exchange membranes containing dispersed inorganic filler. A process in accordance with the invention comprises forming a membrane of polymer having cation exchange groups and dispersing inorganic filler in the membrane by in situ precipitation. Preferred forms of the process in accordance with the invention are useful for dispersing the inorganic proton conductors titanium dioxide and zirconium hydrogen phosphate in the membrane.

DETAILED DESCRIPTION OF THE INVENTION

Membrane Polymers

Figure 1:
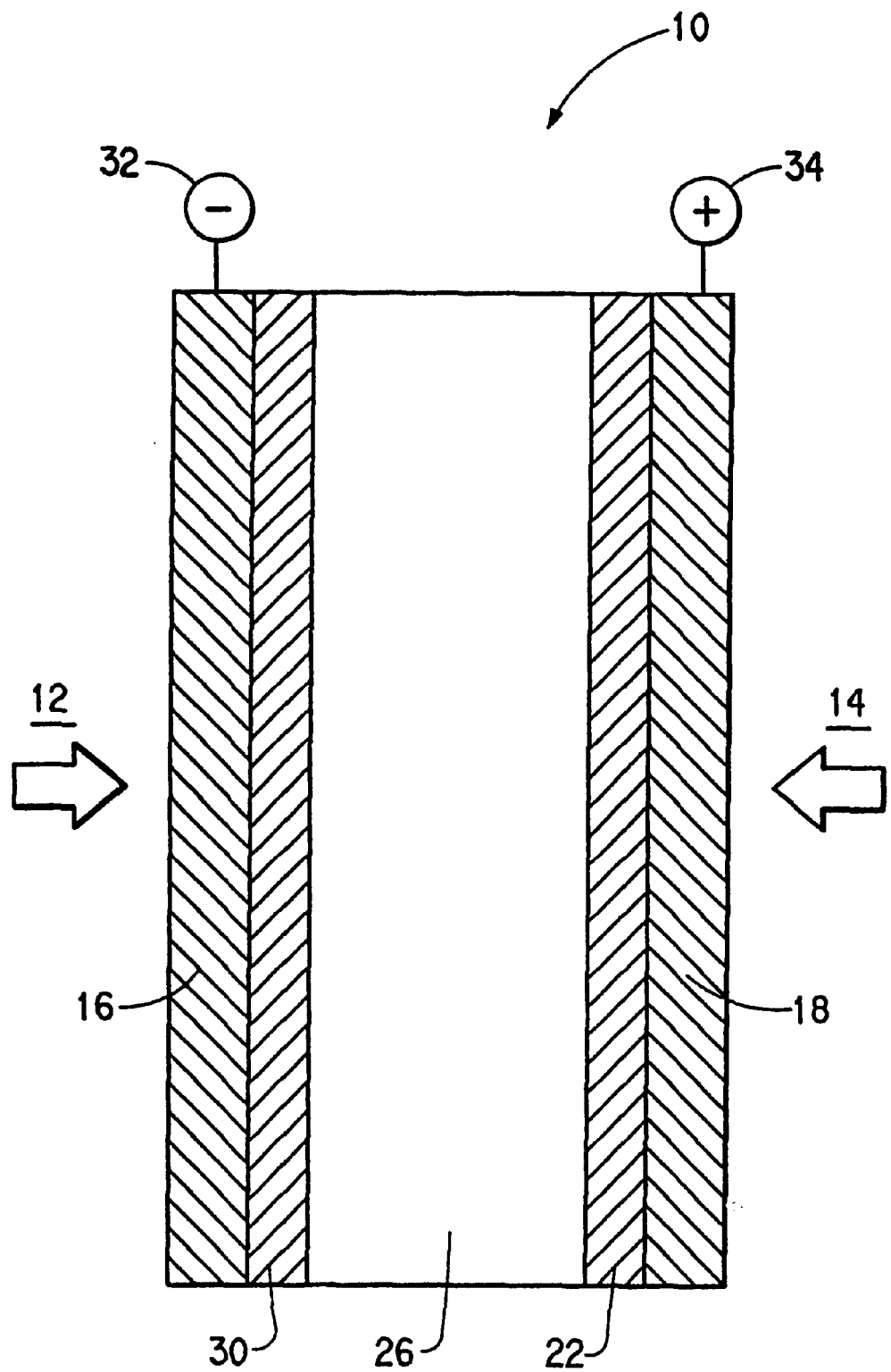
FIG. 1 is a schematic drawing which depicts the structure of a membrane and electrode assembly (MEA) in accordance with the present invention.

A membrane in accordance with the invention is made of a polymer having cation exchange groups which can transport protons across the membrane. The cation exchange groups are preferably selected from the group consisting of sulfonate, carboxylate, phosphonate, imide, sulfonimide and sulfonamide groups. Various known cation exchange polymers can be used including polymers and copolymers of trifluoroethylene, tetrafluoroethylene, styrene-divinyl benzene, $\alpha,\beta,\beta$-trifluorstyrene, etc., in which cation exchange groups have been introduced. $\alpha,\beta,\beta$-trifluorstyrene polymers useful for the practice of the invention are disclosed in U.S. Pat. No. 5,422,411.

In a preferred form of the invention, the polymer comprises a polymer backbone and recurring side chains attached to the backbone with the side chains carrying the cation exchange groups. For example, copolymers of a first fluorinated vinyl monomer and a second fluorinated vinyl monomer having a side cation exchange group or a cation exchange group precursor can be used, e.g., sulfonyl fluoride groups (—$SO_2F$) which can be subsequently hydrolyzed to sulfonic acid groups. Possible first monomers include tetrafluoroethylene, hexafluoropropylene, vinyl fluoride, vinylidine fluoride, trifluoroethylene, chlorotrifluoroethylene, perfluoro(alkyl vinyl ether), and mixtures thereof. Possible second monomers include a variety of fluorinated vinyl ethers with cation exchange groups or precursor groups.

Preferably, the polymer in accordance with the invention has a polymer backbone which is highly fluorinated and the ion exchange groups are sulfonate groups. The term "sulfonate groups" is intended to refer either to sulfonic acid groups or alkali metal or ammonium salts of sulfonic acid groups. "Highly fluorinated" means that at least 90% of the total number of halogen and hydrogen atoms are fluorine atoms. Most preferably, the polymer backbone is perfluorinated. It is also preferable for the side chains to be highly fluorinated and, most preferably, the side chains are perfluorinated.

A class of preferred polymers for use in the present invention include a highly fluorinated, most preferably perfluorinated, carbon backbone and the side chain is represented by the formula —($OCF_2CFR_f)_a$—$OCF_2CFR'_fSO_3X$, wherein $R_f$ and $R'_f$ are independently selected from F, Cl or a perfluorinated alkyl group having 1 to 10 carbon atoms, a=0, 1 or 2, and X is H, an alkali metal, or $NH_4$. The preferred polymers include, for example, polymers disclosed in U.S. Pat. Nos. 4,358,545 and 4,940,525. Most preferably, polymer comprises a perfluorocarbon backbone and said side chain is represented by the formula —O—$CF_2CF(CF_3)$—O—$CF_2CF_2SO_3X$, wherein X is H, an alkali metal, or $NH_4$. Polymers of this type are disclosed in U.S. Pat. No. 3,282,875.

The equivalent weight of the cation exchange polymer can be varied as desired for the particular application. For the purposes of this application, equivalent weight is defined to be the weight of the polymer in sulfonic acid form required to neutralize one equivalent of NaOH. In the case where the polymer comprises a perfluorocarbon backbone and the side chain is the salt of —O—$CF_2$—$CF(CF_3)$—O—$CF_2$—$CF_2$—$SO_3X$, the equivalent weight preferably is 800–1500, most preferably 900–1200. The equivalent weight of the polymers disclosed in U.S. Pat. Nos. 4,358,545 and 4,940,525 is preferably somewhat lower, e.g., 600–1300.

In the manufacture of membranes using polymer which has a highly fluorinated polymer backbone and sulfonate ion exchange groups, membranes are typically formed from the polymer in its sulfonyl fluoride form since it is thermoplastic in this form and conventional techniques for making films from thermoplastic polymer can be used. Alternately, the polymer may be in another thermoplastic form such as by having —$SO_2X$ groups where X is $CH_3$, $CO_2$, or a quaternary amine. Solution film casting techniques using suitable solvents for the particular polymer can also be used if desired.

A film of the polymer in sulfonyl fluoride form can be converted to the sulfonate form (sometimes referred to as ionic form) by hydrolysis using methods known in the art. For example, the membrane may be hydrolyzed to convert it to the sodium sulfonate form by immersing it in 25% by weight NaOH for about 16 hours at a temperature of about 90° C. followed by rinsing the film twice in deionized 90° C. water using about 30 to about 60 minutes per rinse. Another possible method employs an aqueous solution of 6–20% of an alkali metal hydroxide and 5–40% polar organic solvent such as dimethyl sulfoxide with a contact time of at least 5 minutes at 50–100° C. followed by rinsing for 10 minutes. After hydrolyzing, the membrane can be converted if desired to another ionic form by contacting the membrane in a bath containing a 1% salt solution containing the desired cation or, to the acid form, by contacting with an acid and rinsing. For fuel cell use, the membrane is usually in the sulfonic acid form.

If desired, the membrane may be a laminated membrane of two polymers such as two highly fluorinated polymers having different ion exchange groups and/or different ion exchange capacities. Such membranes can be made by laminating two films or co-extruding a film with the two polymer layers. In addition, the membrane may be made of a blend of two or more polymers such as two or more highly fluorinated polymers having different ion exchange groups and/or different ion exchange capacities.

The thickness of the membrane can be varied as desired for a particular electrochemical cell application. Typically, the thickness of the membrane is generally less than about 250 $\mu$m, preferably in the range of about 25 $\mu$m to about 150 $\mu$m.

The membrane may optionally include a porous support for the purposes of improving mechanical properties, for decreasing cost and/or other reasons. The porous support of the membrane may be made from a wide range of components. The porous support of the present invention may be made from a hydrocarbon such as a polyolefin, e.g., polyethylene, polypropylene, polybutylene, copolymers of those materials, and the like. Perhalogenated polymers such as polychlorotrifluoroethylene may also be used. For resistance to thermal and chemical degradation, the support preferably is made of a highly fluorinated polymer, most preferably perfluorinated polymer.

For example, the polymer for the porous support can be a microporous film of polytetrafluoroethylene (PTFE) or a copolymer of tetrafluoroethylene with

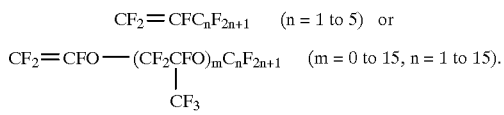

$$CF_2 = CFC_nF_{2n+1} \quad (n = 1 \text{ to } 5) \quad \text{or}$$

$$CF_2 = CFO-(CF_2CFO)_mC_nF_{2n+1} \quad (m = 0 \text{ to } 15, n = 1 \text{ to } 15).$$
$$\qquad\qquad\quad |$$
$$\qquad\qquad\ CF_3$$

Microporous PTFE films and sheeting are known which are suitable for use as a support layer. For example, U.S. Pat. No. 3,664,915 discloses uniaxially stretched film having at least 40% voids. U.S. Pat. Nos. 3,953,566, 3,962,153 and 4,187,390 disclose porous PTFE films having at least 70% voids.

Alternately, the porous support may be a fabric made from fibers of the polymers discussed above woven using various weaves such as the plain weave, basket weave, leno weave, or others.

A membrane can be made using the porous support by coating cation exchange polymer on the support so that the coating is on the outside surfaces as well as being distributed through the internal pores of the support. This may be accomplished by impregnating the porous support solution/dispersion with the cation exchange polymer or cation exchange polymer precursor using a solvent which is not harmful to the polymer of the support under the impregnation conditions and which can form a thin, even coating of the cation exchange polymer on the support. For example, for applying a coating of perfluorinated sulfonic acid polymer to a microporous PTFE support, a 1–10 weight percent solution/dispersion of the polymer in water mixed with sufficient amount of a polar organic solvent can be used. The support with the solution/dispersion is dried to form the membrane. If desired, thin films of the ion exchange polymer can be laminated to one or both sides of the impregnated porous support to prevent bulk flow through the membrane which can occur is large pores remain in the membrane after impregnation.

While membranes in accordance with the invention may contain a porous support and may contain inorganic filler as will be discussed in more detail hereinafter, it is preferred for the cation exchange polymer to be present as a continuous phase within the membrane.

Inorganic Fillers

A wide variety of inorganic fillers may be dispersed in the membranes in accordance with the invention. The inorganic filler may be essentially nonconductive such as type A zeolites of cesium, potassium, or mixtures thereof. Zeolites are a well-defined class of naturally occurring alumino silicate minerals. They are described, e.g., by Alan Dyer in "An Introduction to Zeolite Molecular Sieves," John Wiley & Sons, Chichester, N.Y., 1988.

Preferably, the inorganic filler is an inorganic proton conductor which has the capability for increasing the conductivity of the membrane. Inorganic proton conductors are a known class of inorganic compounds which have the ability to transport protons. Certain classes of inorganic proton conductors are discussed, for example, by Clearfield in Solid State Ionics 46, 35 (1991). Preferred inorganic proton conductors are particle hydrates and framework hydrates. Framework hydrates are especially preferred for use in accordance with the present invention. Preferably, the metal ion of the inorganic proton conductor is selected from the group consisting of Sn, Sb, Mo, W, Ti and Zr, most preferably oxides and phosphates of these metals. Especially preferred inorganic proton conductors are titanium dioxide, tin and hydrogen mordenite, oxides and phosphates of zirconium and mixtures thereof. Preferably, the inorganic proton conductor has a conductivity of at least about $10^{-4}$ S/cm. For the purposes of this application, the conductivity of inorganic proton conductors is measured at room temperature at 50% relative humidity.

The inorganic fillers used in the practice of this are typically commercially available, can be synthesized by known techniques, or are prepared in situ as will be described in more detail hereinafter. Hydrogen mordenite is available, for example, as an $H^+$ mordenite powder from the PQ Corporation, Valley Forge, Pa. Tin mordenites can be prepared by ion exchange from hydrogen mordenite using the procedure described by H. Knudsen et al. in Solid State Ionics 35, 51–55 (1989).

The solubility of inorganic fillers, particularly inorganic proton conductors, varies widely. For use in accordance with the present invention, an inorganic filler having suitably low solubility should preferably be selected to match the intended application so that the inorganic filler does not leach out of the polymer in use at a rate which would detrimentally affect performance.

The amount of inorganic proton conductor used in ion exchange membranes of this invention is preferably in the range about 2 to about 30% by weight, more preferably about 5 to about 25% by weight, based on the total weight of the membrane.

Incorporation of Inorganic Fillers into the Membrane

The production of membranes containing an inorganic filler can be done by a variety of techniques. The inorganic filler can be mixed with a solution/dispersion in a suitable solvent of polymer precursor or with polymer in ionic form and cast as a film. Such solutions can also be used to apply a coatings to porous supports to form the membranes. Thermoplastic polymers, or polymers which can be in thermoplastic form, e.g., the sulfonyl fluoride form of perfluorinated sulfonic acid polymers, can be melt blended with the inorganic filler and a film can be extruded from the molten mixture. For perfluorinated sulfonic acid polymers, hydrolysis of the film to convert it to ionic form can be performed as has been discussed above although care may be required with some inorganic fillers to prevent removal or chemical alteration of the material during hydrolysis.

When the inorganic filler has sufficiently low water solubility, a preferred method of making membranes in accordance with the invention is to precipitate the inorganic filler in situ in the polymer of the membrane. This method can be used either for membranes made by film extrusion, solution film casting, or those made by coating porous supports. Preferably, for polymers such as the perfluorinated sulfonic acid polymer which are typically formed into a film in thermoplastic form, i.e., sulfonyl fluoride form, the membrane is hydrolyzed to its ionic (sulfonate) form before in situ precipitation due to the greater capability of the ionic form to absorb water. For fuel cell applications, the membrane will normally be converted from an alkali metal salt form to the acid (hydrogen ion) form which may be used for the in situ precipitation.

In situ precipitation is preferably accomplished by sequentially contacting the membrane with one or more solutions containing ions or other reactants which form the inorganic filler. Using this procedure, the inorganic filler precipitates in the polymer of the membrane. In one preferred form of the process, zirconium hydrogen phosphate $Zr(HPO_4)_2$ can be precipitated in a membrane of perfluorinated sulfonic acid polymer (preferably in acid form) by soaking the membrane in an aqueous solution of containing zirconium ions, e.g., 1–5M zirconyl chloride, for a time and at a temperature sufficient to penetrate the membrane solution. Then, the membrane is soaked in an aqueous solution containing $(PO_4)^{3-}$ ions, e.g., 20 to 90 weight percent phosphoric acid, for a time and at a temperature sufficient to form zirconium hydrogen phosphate within the membrane. No special conditions are needed for carrying out the process and 2–20 hours at room temperature are suitable times for each of the soaking steps. It may be desirable to rinse the membrane in water after soaking in the zirconium solution to prevent a precipitation of filler on the surface of the membrane.

$TiO_2$ is also preferably dispersed within the polymer of a membrane by in situ precipitation using a process in accordance with the invention. Starting with a membrane, preferably in acid (hydrogen ion) form, a process in accordance with the invention includes soaking the membrane in an alcohol solution of one or more titanium alkoxides of the formula $(RO)_4Ti$. R in this formula is an alkyl group of one to four carbon atoms. The alkoxy groups may be linear groups, such as primary alkoxy groups (e.g., propoxy), or secondary alkoxy groups such as isopropoxy and the four groups per molecule may be the same or may be different. The alcohol solvent in the titanium alkoxide solution is an aliphatic alcohol of the formula R'OH wherein R' is an alkyl group of 1 to 4 carbon atoms, for example, methanol, ethanol, propanol and butanol. The soaking is continued for a time and at a temperature sufficient to swell and expand the membrane. Preferably, temperatures in the range 20–100° C., for a sufficient time such as 1–30 minutes. A temperature of about 75° C. for about 10 minutes has been found to be effective. After soaking, the surface of the membrane is preferably rinsed to wash off surface titanium alkoxide. Alcohols, such as those used for the making the titanium alkoxide solution the soaking step, are useful for rinsing. The next step of the process, is to hydrolyze the titanium alkoxide in the membrane with water. The step of hydrolyzing the titanium alkoxide in place in the membrane is carried out easily. No special conditions are required due to the ease of hydrolysis. Contact times of 10 minutes at room temperature have been found to be suitable.

In one form of the membranes in accordance with the invention and preferred membrane and electrode assemblies and fuel cells in accordance with the invention, the polymer in the bulk of said membrane is substantially free of metal catalysts. Metal catalysts such as platinum, gold, palladium, etc. have been incorporated into known membranes together with metal oxides such as $SiO_2$ and $TiO_2$ for the purposes of internal humidification of the membrane when used in hydrogen-oxygen fuel cells. Such catalysts are expensive and may cause undesirable effects and thus are not desirable for use in accordance with the present invention. As is explained hereinafter, metal catalysts are typically present in membrane and electrode assemblies in which electrodes are formed on the surface of the membrane. By the bulk of the polymer being substantially free of metal catalysts is meant that the polymer in the interior of the membrane is substantially free of metal catalysts. There is no intent by this language, however, to exclude catalysts being present at or on the surface of the membrane.

Membrane and Electrode Assemblies and Electrochemical Cell

With reference to FIG. 1, a membrane in accordance with the invention can be advantageously employed in a membrane electrode assembly (MEA) 10 in which electrodes are formed on the surface of membrane 26. MEA 10 is shown and described for use in a fuel cell although it may be used in other types of electrochemical cells which employ cation exchange membrane, especially those which transport protons across the membrane.

The fuel cell utilizes a fuel source indicated by arrow 12 such as methanol (typically a methanol/water solution) supplied to an anode compartment (not shown) and an oxidizer source indicated by arrow 14 such as air or oxygen supplied to an a cathode compartment (not shown). Membrane 26 serves as an electrolyte (for proton exchange) and separates the anode compartment from the cathode compartment. A porous anode current conductor 16 and a porous cathode current collector 18 are provided to conduct current from the cell. A catalyst layer 22 which functions as the cathode is in contact with and between the cathode-facing surface of membrane 26 and the cathode current collector 16. A catalyst layer 30 which functions as the anode is disposed between and is in contact with the anode-facing surface of the membrane 26 and anode current conductor 16. Cathode current collector 18 is electrically connected to positive terminal 34 and anode current collector 16 is electrically connected to negative terminal 32.

The catalyst layers 22 and 30 may be made from well-known electrically conductive, catalytically active particles or materials and may be made by methods well known in the art. The catalyst layer 22 may be formed as a film of a polymer which serves as a binder for the catalyst particles. The binder polymer can be a hydrophobic polymer, a hydrophilic polymer or a mixture of such polymers. Preferably, the binder polymer is a polymer having cation exchange groups and most preferably is the same polymer as in the membrane. For example, in an MEA using a perfluorinated sulfonic acid polymer membrane and a platinum catalyst, the binder polymer can also be perfluorinated sulfonic acid polymer and the catalyst can be a platinum catalyst supported on carbon particles. In the catalyst layers 22 and 30, the particles are preferably uniformly dispersed in the polymer to assure that a uniform and controlled depth of the catalyst is maintained, preferably at a high volume density with the particles being in contact with adjacent particles to form a low resistance conductive path through catalyst layer.

The catalyst layers 22 and 30 formed on the membrane should be porous so that they are readily permeable to the gases/liquids which are consumed and produced in cell. The average pore diameter is preferably in the range of 0.01 to 50 $\mu$m, most preferably 0.1 to 30 $\mu$m. The porosity is generally in a range of 10 to 99%, preferably 10 to 60%.

The catalyst layers are preferably formed using an "ink", i.e., a solution of the binder polymer and the catalyst particles, which is used to apply a coating to the membrane. The viscosity of the ink is preferably controlled in a range of 1 to $10^2$ poises especially about $10^2$ poises before printing. The viscosity can be controlled by (i) selecting particle sizes, (ii) composition of the catalytically active particles and binder, (iii) adjusting the water content (if present), or (iv) preferably by incorporating a viscosity regulating agent such as carboxymethyl cellulose, methyl cellulose, hydroxyethyl cellulose, and cellulose and polyethyleneglycol, polyvinyl alcohol, polyvinyl pyrrolidone, sodium polyacrylate and polymethyl vinyl ether.

The area of the membrane to be coated with the ink may be the entire area or only a select portion of the surface of the membrane. The catalyst ink may be deposited upon the surface of the membrane by any suitable technique including spreading it with a knife or blade, brushing, pouring, metering bars, spraying and the like. If desired, the coatings are built up to the thickness desired by repetitive application. Areas upon the surface of the membrane which require no catalyst materials, can be masked, or other means can be taken to prevent the deposition of the catalyst material upon such areas. The desired loading of catalyst upon the membrane can be predetermined, and the specific amount of catalyst material can be deposited upon the surface of the membrane so that no excess catalyst is applied. The catalyst particles are preferably deposited upon the surface of a membrane in a range from about 0.2 $mg/cm^2$ to about 20 $mg/cm^2$.

A particularly advantageous method of applying the catalyst layers to the membrane is to use a screen printing process. It is preferable to use a screen having a mesh number of 10 to 2400, especially mesh number of 50 to 1000 and a thickness in the range of 1 to 500 m$\mu$. It is preferable to select the mesh and the thickness of the screen and control the viscosity of the ink so as to give the thickness of the electrode ranging from 1 micron to 50 microns, especially 5 microns to 15 microns. The screen printing can be repeated as needed to apply the desired thickness. Two to four passes, usually three passes, has been observed to produce the optimum performance. After each application of the ink, the solvent is preferably removed by warming the electrode layer to about 50° C. to 140° C., preferably about 75° C.

A screen mask is used for forming an electrode layer having a desired size and configuration on the surface of the ion exchange membrane. The configuration is preferably a printed pattern matching the configuration of the electrode. The substances for the screen and the screen mask can be any materials having satisfactory strength such as stainless steel, poly(ethylene terephthalate) and nylon for the screen and epoxy resins for the screen mask.

After forming the catalyst coating, it is preferable to fix the ink on the surface of the membrane so that a strongly bonded structure of the electrode layer and the cation exchange membrane can be obtained. The ink may be fixed upon the surface of the membrane by any one or a combination of pressure, heat, adhesive, binder, solvent, electrostatic, and the like. The preferred embodiment for fixing the ink upon the surface of the membrane employs pressure, heat or by a combination of pressure and heat. The electrode layer is preferably pressed onto the surface of the membrane at 100° C. to 300° C., most preferably 150° C. to 280° C., under a pressure of 510 to 51,000 kPa (5 to 500 ATM), most preferably 1,015 to 10,500 kPa (10 to 100 ATM).

An alternative to printing the catalyst layer directly onto the membrane is the so-called "decal" process. In this process, the catalyst ink is coated, painted, sprayed or screen printed onto a substrate and the solvent is removed. The resulting "decal" is then subsequently transferred from the substrate to the membrane surface and bonded, typically by the application of heat and pressure.

In accordance with another form of the invention, membrane and electrode assembly is provided in which its electrode comprises a layer of electrically conductive, catalytically active particles and binder polymer having cation exchange groups with the binder polymer containing inorganic filler dispersed therein. The fillers which have been discussed previously can be suitable for incorporation into the binder polymer. Preferably, the binder polymer is the same as polymer of the membrane. Suitable polymers have been discussed previously in this patent application. In this form of the invention, it is also advantageous for the polymer of the membrane to have inorganic filler dispersed therein.

The inorganic filler can be incorporated into the binder polymer of the electrode in one of a variety of methods. One method is to incorporate the filler into the electrode ink formulation which may be directly applied to a membrane to make an MEA or may be used to form a "decal" which is subsequently applied to the membrane. A preferred method for dispersing suitable inorganic fillers in the binder polymer of an MEA is by in situ precipitation. Using the same process steps as are used to disperse fillers into a membrane as described previously, an inorganic filler can be dispersed in the binder polymer of the electrode of an MEA and, at the same time, dispersed in the polymer of the membrane. Similarly, an in situ precipitation process can be used to disperse inorganic filler in a binder polymer of an electrode "decal". Regardless of the method used to incorporate the inorganic filler in the electrode layer, care should be taken in adjusting the loading and distribution of the filler so that porosity of the electrode layer is maintained at the desired level.

The anode current collector 16 and the cathode current collector 18 may be constructed as is known in the art. These structures may be the same or different. Access of oxygen, typically air to the catalyst layer is provided by employing a porous cathode current collector 18. Similarly, the anode current collector 16 is porous to permit the access of the methanol/water solution. While conductive metal screens, porous plates or other materials may also be used, a preferred material for the current collectors is conductive paper or cloth made of carbon fibers with suitable conductivity and porosity. Typically, the current collectors are bonded to the MEA by the application of heat and pressure.

In methanol weight gain tests, membranes in accordance with the invention with inorganic fillers dispersed therein absorb less methanol than control membranes. Similarly, a reduction in methanol transport accompanying incorporation of inorganic proton conductor is observed. It is believed that the inorganic fillers operate by filling the holes or interstices in the membrane with an organophobic material which serves to slow or block organic fuels such as methanol from diffusing through the membrane. In addition, in comparison to known membranes, preferred membranes containing inorganic proton conductors in accordance with the invention have increased proton conductivity.

The membranes in accordance with the invention are advantageously employed in MEA's for electrochemical cells, particularly fuel cells employing direct feed organic fuels such as methanol where less fuel crossover is desired. The membranes also have enhanced mechanical properties such as stiffness.

The invention is illustrated in the following examples.

EXAMPLE 1

This example illustrates the inorganic proton conductor, $Zr(HPO_4)_2$, being precipitated in situ in the polymer of a cation exchange membrane sold under the trademark NAFION@ by E. I. du Pont de Nemours and Company. The membrane is 5 mil (~125 μm) thick and is made from a sulfonated perfluorocarbon copolymer having a perfluorocarbon backbone and side chains of —O—$CF_2CF(CF_3)$—O—$CF_2CF_2SO_3H$ in hydrogen ion form and which has an equivalent weight of about 1080. The membrane is soaked in aqueous zirconyl chloride solution (Aldrich) at approximately 80° C. for about 6 hr. The membrane is rinsed twice with deionized water, and is then soaked in phosphoric acid diluted with water in 1:1 ratio (about 43 weight % when diluted) for about 12 hours. The treated membrane is finally rinsed and boiled with deionized water to remove unreacted phosphoric acid.

X-ray fluorescence analysis for Zr presence shows 1321 counts/sec, whereas the starting membrane shows a background of 1.9 counts/sec. Inspection of the membranes revealed that the membrane containing $Zr(HPO_4)_2$ is significantly stiffer than the starting membrane.

Membranes dried at room temperature are additionally dried at 110° C. for approximately 10 min. Liquid uptake at room temperature (about 23° C.) is determined by measuring the weight gained after the dried membranes were soaked for 5 hr in deionized water and in dry methanol stored over molecular sieves. Weight gains are 20.5% for water and 40.0% for methanol. For the starting membrane, the corresponding weight gains are 22.0% and 54.0%, respectively.

Ionic (proton) conductivity is measured at 100% relative humidity on membranes conditioned in boiling water for about 1 hr using a Model SI 1260 Impedance/Gain-Phase Analyzer, Solartron Instruments, Houston, Tex. Conductivity of the membrane containing $Zr(HPO_4)_2$ is 0.64 S/cm, while the conductivity of the starting membrane is 0.40 S/cm.

Permeability to a 10% solution by volume of methanol in deionized water is measured at 65° C. by using a Thwing Albert Cup manufactured by the Thwing Albert Co. For the membrane containing $Zr(HPO_4)_2$ the permeation rate is 0.0047 g/min.cm and the methanol concentration in the permeated mixture is 5.5 volume %. In contrast, for the starting membrane, permeation rate is 0.0082 g/min.cm and the methanol concentration in the permeated mixture is 8.3 volume %.

EXAMPLE 2

This example illustrates the inorganic proton conductor, tin mordenite, being dispersed within a membrane by using solution film casting.

A solution is prepared using water and alcohol as a solvent containing 65 wt. % of sulfonated perfluorocarbon copolymer having as a perfluorocarbon backbone and side chains of —O—$CF_2CF(CF_3)$—O—$CF_2CF_2SO_3H$ in hydrogen ion form and which has an equivalent weight of about 1080. Tin mordenite is prepared from H-mordenite (supplied by PQ Corp., Valley Forge, Pa. under the trademark VALFOR CP 511-13) by cation exchange. The tin mordenite is added to the solution in an amount to provide 5 wt. % of tin mordenite in the resulting membrane and the solution is poured onto a polytetrafluoroethylene sheet substrate and film casting is done using a doctor blade arrangement. The resulting membrane is generally light brown in color and has a thickness of about 10–12 mil (250–300 μm).

Methanol and water weight gain are performed on the resulting membranes by the same method described in as used in Example 1. Water and methanol weight gain are reported in the following Table 1 compared to a control membrane made by the same solution film casting procedure but containing no tin mordenite.

TABLE 1

|   | Water(Wt. %) | Methanol(Wt. %) |
| --- | --- | --- |
| 1. Control | 24.0 | 146.0 |
| 2. 5% Sn—Mordenite | 22.5 | 117.0 |

Conductivity measurements are also done as detailed in EXAMPLE 1. Conductivity for the membrane containing Sn-mordenite is essentially the same as the control membrane.

EXAMPLE 3

This example illustrates the inorganic proton conductor, titanium dioxide, being dispersed within a membrane by precipitation in situ in the polymer of the same cation exchange membrane as used in Example 1.

A piece of the sulfonated perfluorocarbon polymer was cut to 54 by 74 mm (corners cut), weighing 1.105 g, was soaked in 20 ml of 1-propanol and 5 ml of $HC(OCH_3)_3$ to remove water. It was then warmed for 10 minutes at about 50° C. Then the solution was poured off.

The polymer piece was then soaked in a mixture of 5 ml n-propanol and 1.5 ml of $(n—C_4H_9—O)_4Ti$. After 1 hour at room temperature, an additional 2.5 ml of $(n—C_4H_9—O)_4Ti$ was added and the piece was soaked for an additional hour.

The solution was then poured off, and the piece was rinsed 1–2 seconds in room-temperature methanol. The piece was then placed in distilled water at 75° C. The piece turned stiff and milky. After 10 minutes at 75–80° C., it was rinsed in cold water and wiped. It was hung and dried in air overnight. The final weight was 1.44 g, an 18% weight increase, indicating significant $TiO_2$ loading; and hence reduced methanol migration in a fuel cell.

What is claimed is:

1. A fuel cell for operation with a direct feed organic fuel, said fuel cell comprising an anode compartment containing an anode, a cathode compartment containing a cathode and a membrane serving as a separator and electrolyte between said anode and cathode compartment, and said membrane comprising a polymer having cation exchange groups and having inorganic filler dispersed therein.

2. The fuel cell of claim 1 wherein said inorganic proton conductor is selected from the group consisting of particle hydrates and framework hydrates.

3. The fuel cell of claim 1 wherein said inorganic proton conductor is selected from the group consisting of titanium dioxide, tin and hydrogen mordenite, oxides and phosphates of zirconium, and mixtures thereof.

4. The fuel cell of claim 1 wherein said inorganic proton conductor has a conductivity of at least about $10^{-4}$ S/cm.

5. The fuel cell of claim 1 wherein said cation exchange groups of said polymer of said membrane are selected from the group consisting of sulfonate, carboxylate, phosphonate, imide, sulfonimide and sulfonamide.

6. The fuel cell of claim 1 wherein said polymer of said membrane comprises highly fluorinated polymer with sulfonate cation exchange groups.

7. The fuel cell of claim 6 wherein said polymer of said membrane comprises a highly fluorinated carbon backbone and said side chain is represented by the formula —$(OCF_2CFR_f)_a$—$OCF_2CFR'_fSO_3X$, wherein $R_f$ and $R'_f$ are independently selected from F, Cl or a perfluorinated alkyl group having 1 to 10 carbon atoms, a=0, 1 or 2, and X is H, an alkali metal or $NH_4$.

8. The fuel cell of claim 1 wherein at least one of said anode or said cathode are formed from a layer of electrically-conductive, catalytically active particles on the surface of said membrane.

* * * * *

UNITED STATES PATENT AND TRADEMARK OFFICE
CERTIFICATE OF CORRECTION

PATENT NO. : 5,919,583

DATED : July 6, 1999

INVENTOR(S) : Walther Gustav Grot, Govindarajulu Rajendran

It is certified that error appears in the above-identified patent and that said Letters Patent is hereby corrected as shown below:

Column 12, line 41, insert --cation exchange-- before "membrane".

Column 12, line 42, in place of "compartment" should appear --compartments--.

Column 12, lines 43 and 44, in place of "and having inorganic filler dispersed therein" should appear --, the polymer in the bulk of said membrane having inorganic proton conductor dispersed therein and being substantially free of metal catalysts--.

Signed and Sealed this

Twenty-fifth Day of January, 2000

Attest:

Attesting Officer

Acting Commissioner of Patents and Trademarks